H. N. ATWOOD AND G. B. BAINS, 3D.
COMPOSITE LAMINATED STRUCTURE AND METHOD OF PRODUCING SAME.
APPLICATION FILED DEC. 24, 1920.
1,403,142.
Patented Jan. 10, 1922.
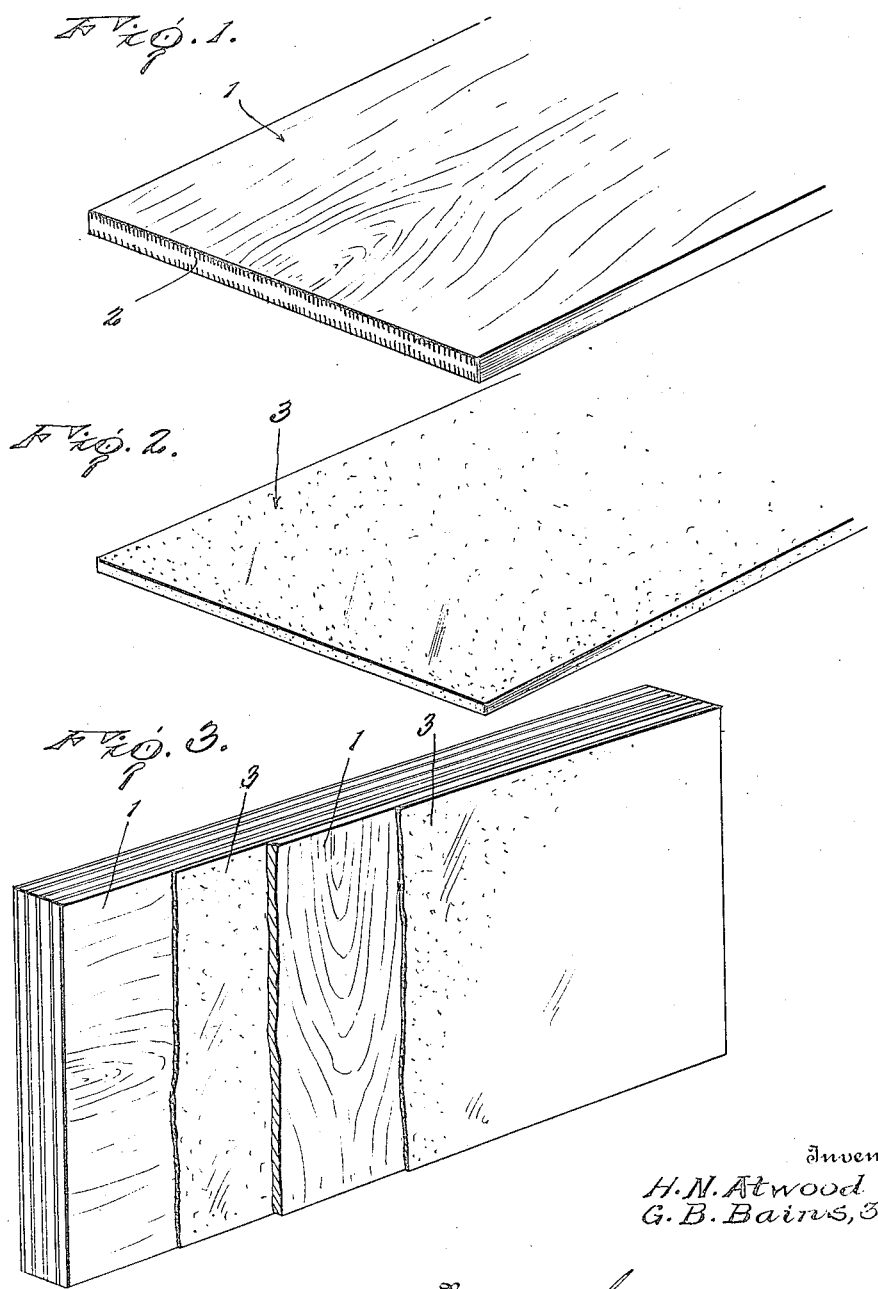

UNITED STATES PATENT OFFICE.

HARRY N. ATWOOD AND GEORGE B. BAINS, 3d, OF READING, PENNSYLVANIA.

COMPOSITE LAMINATED STRUCTURE AND METHOD OF PRODUCING SAME.

1,403,142.　　　　　Specification of Letters Patent.　　Patented Jan. 10, 1922.

Application filed December 24, 1920. Serial No. 432,938.

*To all whom it may concern:*

Be it known that we, HARRY N. ATWOOD and GEORGE B. BAINS, 3d, citizens of the United States, residing at Reading, in the county of Berks and State of Pennsylvania, have invented certain new and useful Improvements in Composite Laminated Structures and Methods of Producing Same, of which the following is a specification.

This invention has as its object to provide a novel composite laminated structure and to evolve a novel method of producing the same.

It has previously been proposed to unite veneer plies or slabs of wood of greater or less thickness through the medium of adhesives or cements of a water-proof nature so as to insure against separation of the plies thus united. However, this previously employed method does not result in a product which as a unit is water-proof or proof against atmospheric moisture. Furthermore, the product thus obtained is not proof against loss of the natural moisture and volatile contents of the component wood parts thereof, so that as a result the product is liable to deterioration either through the effects of atmospheric or sensible moisture, or, under contrary conditions, is subject to loss of its valuable original properties through evaporation or the driving off of its natural moisture and volatile contents. Therefore one of the primary objects of the present invention is to provide a composite laminated structure which will not be subject to the deteriorating effects of atmospheric or sensible moisture and which will be proof against the loss of its valuable inherent properties resulting from the presence of a natural moisture and volatile content. Therefore the present invention contemplates a composite laminated structure embodying veneer plies or wood slabs and which structure will be durable and retain for an indefinite period of time its valuable properties of strength, integrity, etc.

Another object of the invention is to provide a composite laminated structure which may be put to many uses and employed in the building up of many different structures, articles, or devices and which will be capable of withstanding vibrations, shocks and impacts, and in fact all forces of any character tending to disrupt or destroy the same, the structure comprising wood or other fibrous plies and bonding media of such a character as to more or less elastically bond together the said fibrous plies so that the structure as a unit will be capable of absorbing shocks, vibrations, impacts, and other kinetic forces.

Another object of the invention is to evolve a novel method whereby the wood plies may be bonded together through the medium of rubber bonding plies in such a manner as to bring about incorporation of the uniting or bonding plies with the plies to be united or bonded together, so that the union will be more than a superficial one, and the permanency of the product will be assured.

In the accompanying drawings:

Figure 1 is a perspective view illustrating one of the wood plies produced in accordance with one step of the method;

Figure 2 is a similar view of one of the bonding plies;

Figure 3 is a perspective view, parts being shown in section and parts being broken away, illustrating the finished composite structure.

In the drawings, the numeral 1 indicates in general one of the wood plies, and this ply may be of veneer either produced by slicing or rotary cutting, or it may be in the nature of a slab of wood of the required thickness, the marginal contour and dimensions of the slab being varied as desired. In preparing this slab the same is dipped, immersed, coated or otherwise treated with some suitable rubber solvent such for example as a solution of rubber in benzol, it being understood that any liquid rubber solvent found suitable for the purpose may be employed and that the invention is in no way limited to the use of any particular solvent. In treating the wood ply with rubber solvent as above pointed out, the ply will become impregnated to a greater or less degree with the solvent, and the manner of treating the ply with the solvent and the period of such treatment may be regulated so as to control the degree of impregnation of the ply with the solvent, as the judgment of the operator may dictate. In Figure 1 of the drawings a portion of the ply 1 is shown in perspective and in section, and the solvent which has entered the pores of the wood is indicated in this figure by the numeral 2. Not only does the solvent enter the pores of the wood plies, but the treatment of the ply with the solvent may be so controlled, if desired, as to produce a film or coating of the solvent upon the surfaces of the ply of a more or less appreciable thickness.

One of the bonding plies is clearly shown in Figure 2 as indicated in general by the numeral 3, and this bonding ply is produced by passing a quantity of crude rubber or a composition of rubber and other materials between calendering rolls or otherwise acting upon the same to produce a sheet of such material.

Having produced the required number of impregnated wood plies 1 and bonding plies 3, the plies are alternately arranged and assembled in superposed relation until the assemblage is of a predetermined thickness. Figure 3 of the drawings illustrates the completed product and it will be observed from this figure that the grain in alternate plies extends non-parallel. That is to say the grain in one ply may run at right angles or at any other desired angle to the grain in the next adjacent ply 1, and this angular relative disposition of the adjacent plies may be varied within wide limits so long as the grain in adjacent plies is non-parallel.

Having assembled the required number of wood and bonding plies in superposed relation in the manner above pointed out, the assemblage as a whole is subjected to pressure and heat to effect vulcanization of the rubber constituent of the bonding plies, and during this step in the method a greater or less percentage of the contained moisture in the wood plies 1 will be converted into steam thus assisting in the process of vulcanization and also reliquefying or converting to a plastic or solving state the impregnating rubber solvent carried by the plies 1, and causing this solvent to take up and carry into the pores of the said plies a greater or less quantity of the rubber constituent of the bonding plies. As a result of the step of vulcanization, a greater or less percentage of the rubber constituent of the bonding plies is carried into and becomes intimately incorporated in the wood plies so that the bond between the wood and bonding plies is more intimate than a superficial one.

It will be evident from the foregoing that the product is, throughout all of its portions, protected against the deteriorating effects of moisture whether atmospheric or sensible and that the wood constituent of the product will retain all of its original and natural properties.

It is preferable that the arrangement of the plies 1 and 3 be such that all portions of the exterior surface of the finished product will represent one or more of the plies 3 although if it is desired to obtain a product having a wood exterior surface or finish, the arrangement of the plies 1 and 3 may be such that certain of the plies 1 will be exposed at the surfaces of the product rather than the plies 3, as previously pointed out.

It will be understood that in Figure 3 of the drawings is illustrated merely a rectangular piece of the composite structure produced by the method, and that products of various shapes and dimensions may be obtained and that the composite structure may be worked in various ways and by various tools.

Having thus described the invention, what is claimed as new is:

1. A composite laminated structure comprising plies of fibrous material, and a rubber bonding ply uniting the same, the said rubber bonding ply being intimately incorporated with the first-mentioned plies.

2. A composite laminated structure comprising plies of fibrous material impregnated with a rubber solvent, and a bonding ply uniting the first-mentioned plies and having a rubber content partially absorbed by the impregnating solvent of the first-mentioned plies.

3. The method of producing a composite laminated structure which comprises impregnating a fibrous ply with a rubber solvent, applying a ply to the first-mentioned ply having a rubber content, and subjecting the assembled plies to a process of vulcanization.

4. The method of producing a composite laminated structure which comprises impregnating fibrous plies with a rubber solvent, disposing between the said plies a ply having a rubber content, and subjecting the assemblage to heat and pressure.

In testimony whereof we affix our signatures.

HARRY N. ATWOOD. [L. S.]
GEORGE B. BAINS, 3D. [L. S]